United States Patent

[11] 3,622,545

[72] Inventors Veronika Foldi
Wilmington, Del.;
Joseph C. Shivers, West Chester, Pa.
[21] Appl. No. 876,988
[22] Filed Nov. 14, 1969
[45] Patented Nov. 23, 1971
[73] Assignee E. I. du Pont de Nemours and Company
Wilmington, Del.

[54] HIGH MOLECULAR WEIGHT AROMATIC-ALIPHATIC ORDERED COPOLYAMIDES
13 Claims, No Drawings
[52] U.S. Cl........................................ 260/78,
260/29.2, 260/30.6, 260/32.6, 260/32.8, 260/33.4,
264/210, 264/290
[51] Int. Cl..................................................... C08g 20/20
[50] Field of Search........................................... 260/78 A;
264/210, DIG. 61

[56] References Cited
UNITED STATES PATENTS
3,296,213 1/1967 Preston .......................... 260/78

Primary Examiner—William H. Short
Assistant Examiner—Howard Schain
Attorney—Eugene Berman ABSTRACT: High molecular weight aromatic-aliphatic ordered copolyamides consisting essentially of repeating structural units corresponding to the formula

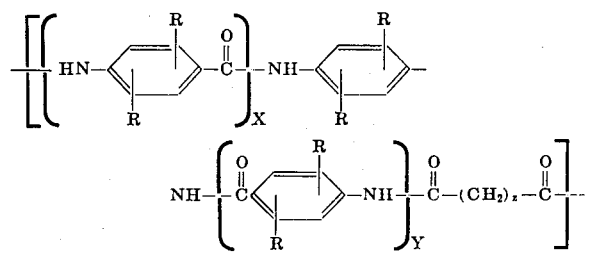

wherein X and Y are individually selected positive integers and the sum of X+Y is an integer within the range of 4 to 24, inclusive, Z is an integer from 2 to 12, inclusive, and each R is individually selected from the group consisting of hydrogen and a monovalent radical replacement for hydrogen on nuclear carbon which is nonreactive in polyamidation reactions, are prepared. These copolyamides are useful in the preparation of shaped articles (e.g., fibers and films).

HIGH MOLECULAR WEIGHT AROMATIC-ALIPHATIC ORDERED COPOLYAMIDES

This invention relates to novel, high molecular weight, ordered copolyamides characterized by alternating aromatic and aliphatic amide segments and to shaped articles (e.g., films and high strength fibers) prepared therefrom.

DESCRIPTION OF THE PRIOR ART

Ordered polyamides and copolyamides having both aromatic and aliphatic segments are described in Detoro U.S. Pat. No. 3,206,439 and in Preston U.S. Pat. No. 3,296,213. Aromatic-aliphatic polyamides are also shown in Wheatley et al. U.S. Pat. No. 2,688,011 and in Huffman et al. U.S. Pat. No. 3,203,933.

SUMMARY OF THE INVENTION

This invention provides film- and fiber-forming ordered copolyamides consisting essentially of repeating structural units corresponding to the formula (I)

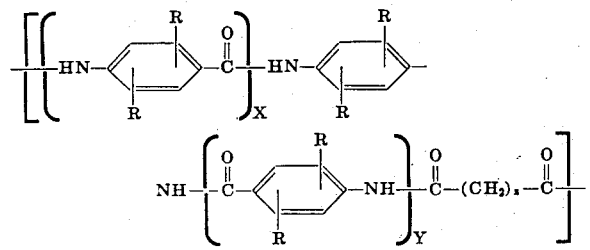

wherein X and Y are individually selected positive integers and the sum of X+Y is an integer within the range of 4 to 24, inclusive, Z is an integer from 2 to 12, inclusive, and each R is individually selected from the group consisting of hydrogen and a monovalent radical replacement for hydrogen on nuclear carbon which is nonreactive in polyamidation reactions. The ring substituents R are preferably selected from the group consisting of halogen, lower alkyl, lower alkoxy, cyano, nitro, alkylthio, alkylsulfonyl, alkylsulfamoyl, and carboalkoxy.

Shaped articles prepared from the above-described copolyamides, such as films and high strength fibers, are also comprehended by this invention. High level tensile properties are imparted to the fibers by a post-extrusion heat treatment. The combination of tenacity and modulus properties which characterize the copolyamides of this invention are particularly unusual for copolyamides having aliphatic segments.

The copolyamides of this invention exhibit inherent viscosities of at least about 0.8, preferably above 1, when measured by procedures subsequently described.

DESCRIPTION OF THE PREFERRED EMBODIMENTS

Copolyamides

The ordered copolyamides of this invention may be prepared by low temperature solution polymerization techniques wherein aromatic diamines containing preformed amide linkages are caused to react with amide-forming derivatives of suitable aliphatic dibasic acids. These aromatic macrodiamines, preferably formed in situ prior to the addition of the dibasic acid comonomer, correspond to the formula:

(II)

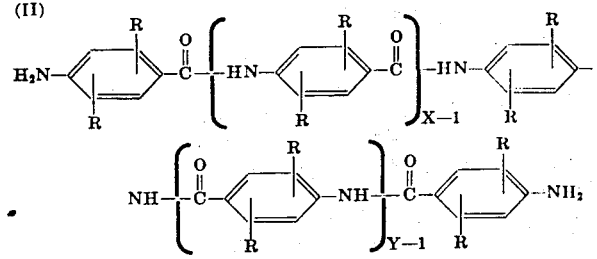

wherein X, Y, and R have the significance previously recited.

The diamine of formula (II) may be formed in situ by the reaction between p-phenylenediamine and/or ring-substituted derivatives thereof and suitable 4-aminobenzoic acid derivatives and/or ring-substituted derivatives thereof. Preferred among the aminobenzoic acid derivatives are benzoyl hydrohalides of the formula (III)

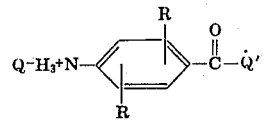

wherein Q and Q' represent halogen, either or both preferably being chlorine or bromine, and R has the significance set forth hereinbefore. The singularly preferred formula (III) reactant is 4-aminobenzoyl chloride hydrochloride, with other useful formula (III) reactants being 4-aminobenzoyl chloride hydrobromide, 4-aminobenzoyl bromide hydrochloride, 4-aminobenzoyl bromide hydrobromide, 3-fluoro-4-aminobenzoyl chloride hydrochloride
2-chloro aminobenzoyl chloride hydrochloride
3-carbomethoxy aminobenzoyl chloride hydrochloride
3-bromo-aminobenzoyl chloride hydrochloride
3-iodo-aminobenzoyl chloride hydrochloride
2-fluoro-aminobenzoyl chloride hydrochloride
2,3-dimethyl-aminobenzoyl chloride hydrochloride
3-ethyl-aminobenzoyl chloride hydrochloride
2-nitro-aminobenzoyl chloride hydrochloride
3-ethoxy-aminobenzoyl chloride hydrochloride
2-ethoxy-5-nitro-aminobenzoyl chloride hydrochloride
2-propoxy-aminobenzoyl chloride hydrochloride
2-isobutosy-aminobenzoyl chloride hydrochloride
2-sec.butoxy-aminobenzoyl chloride hydrochloride
3-propoxy-aminobenzoyl chloride hydrochloride
3-isopropoxy-aminobenzoyl chloride hydrochloride
3-butoxy-aminobenzoyl chloride hydrochloride
2-methylthio-aminobenzoyl chloride hydrochloride
2-ethylthio-aminobenzoyl chloride hydrochloride
2,5-dimethyl aminobenzoyl chloride hydrochloride
2-ethysulfonyl-aminobenzoyl chloride hydrochloride
2-dimethylsulfamoyl-aminobenzoyl chloride hydrochloride Other 4-aminobenzoic acid derivatives not conforming to formula (III) are also useful, e.g., 4-aminobenzoyl chloride methanesulfonate, 4-aminobenzoyl chloride benzenesulfonate, and 4-aminobenzoyl bromide ethanesulfonate In preparing a formula (II) diamine, (X+Y) moles of the aminobenzoic acid derivative or derivatives are used for each mole of p-phenylenediamine or derivatives employed.

p-Oriented aromatic diamines which can be caused to react with 4-aminobenzoic acid and derivatives thereof according to this invention correspond to the formula:

(IV)

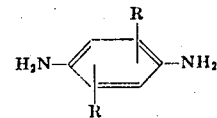

wherein R has the significance defined hereinbefore. Useful formula (IV) diamines include p-phenylenediamine, 2,5-toluenediamine, 2-nitro-p-phenylenediamine, 2,3-dichloro- p-phenylenediamine, 2,5-dichloro-p-phenylenediamine, 2,6-dichloro-p-phenylenediamine, 2-bromo-p-phenylenediamine, and 2,5-dibromo-p-phenylenediamine.

Dicarboxylic acids whose amide-forming derivatives may be employed to prepare the copolyamides of this invention correspond to the formula (V) 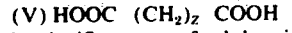

wherein Z has the significance set forth hereinbefore. Useful formula (V) acids are succinic, glutaric, adipic, pimelic, suberic, azelaic, sebacic, undecanedioic, dodecanedioic, tridecanedioic, and tetradecanedioic. These dicarboxylic acids are conveniently employed in the form of their dihalides which are readily prepared by well-known methods. The diacid chloride is usually preferred.

The formula (I) copolyamides of this invention which are especially preferred for fiber preparation are those wherein (1) the sum of X+Y is 8 and Z is 4 and (2) the sum of X+Y is 12 and Z is 4. Other preferred copolyamides are those wherein the sum of X+Y is 23 and Z is 4, and wherein the sum of X+Y is 12 and Z is 5.

Polymerization Conditions

In the low temperature solution polymerization process, i.e., under 50° C., and preferably from 0° to 30° C., which provides the novel polymers of this invention, a solvent or a mixture of solvents selected from the group consisting of hexamethylphosphoramide, N,N-dimethylacetamide, N,N-dimethylpropionamide, N-methylpyrrolidone-2, and N,N,N',N'-tetramethylurea is preferably employed.

The preparation and isolation of a formula (I) copolyamide may be carried out by first placing the desired quantity of the aminobenzoic acid derivative(s) in a thoroughly dried reaction vessel equipped with a stirrer, nitrogen inlet, and drying tube; the reactant may be moistened with a small amount of appropriate liquid, e.g., tetrahydrofuran. To this slowly stirred mixture, swept with a stream of dry nitrogen, is rapidly added an appropriate amount of formula (IV) diamine(s) dissolved in a quantity of suitable solvent (e.g., hexamethylphosphoramide) sufficient to give a final concentration of copolyamide of formula (I) within the range of about 6 to 12 weight percent. The rate of stirring is increased; after stirring is continued for about 0.5 hour at autogenous temperature, the stirred reaction mixture is cooled (e.g., on an ice bath) for about 0.5 hour. The acid halide(s) of formula (V), which may be dissolved in an appropriate solvent (e.g., is then added to the cold solution of the macrodiamine of formula (II). Stirring and cooling are continued for about 0.5–1 hour, after which the reaction mixture is permitted to stand overnight at room temperature. Depending upon the composition and concentration of the copolyamide of formula (I), the reaction mixture obtained may be a stiff gel, a thick paste, or a solution. The reaction mixture may be combined with water, the copolymer isolated, washed (e.g., in a blender with water and alcohol), and dried in an oven prior to being redissolved for further processing. Yields are usually quantitative.

CHain terminators to limit the molecular weight of the copolyamides of this invention may be used if desired. These may be added with the formula (V) reactant. Among the suitable chain terminators are compounds which can react with acid chloride groups such as ammonia, monoamines e.g., ethylamine, dimethylamine, diethylamine, butylamine, dibutylamine, cyclohexylamine, aniline, etc.), compounds containing a single amide-forming group such as N,N-diethylethylenediamine, hydroxylic compounds such as methyl alcohol, ethyl alcohol, isopropyl alcohol, phenol, etc., and compounds which can react with amine groups such as other acid chlorides (e.g., acetyl chloride), acid anhydrides (e.g., acetic anhydride, phthalic anhydride), and isocyanates (e.g., phenylisocyanate, ethyl isocyanate, etc.).

Lithium chloride advantageously may be present in the polymerization mixture since this salt may assist in maintaining a fluid, stirrable, mixture during polymerization. The salt may be added at the beginning of the reaction, during its course or may be formed in situ. At least 4 weight percent (based on the combined weight of all ingredients) of salt is suitable. For the preparation of spinning dopes by dissolution of isolated polymers as well as for the preparation of dopes via in situ polymer formation and fiber extrusion, a lithium chloride range of about 4 to about 6 weight percent is preferred.

When, with proper choice of comonomers used in the polymerization, hydrogen chloride is generated as a byproduct of the polymerization reaction, the salt may also be provided by forming it in situ by neutralizing the hydrogen chloride with a base selected from the group consisting of lithium carbonate, lithium oxide, lithium hydroxide (includes monohydrate), and lithium hydride, or mixtures thereof. The neutralization is especially preferred in embodiments of this invention wherein the reaction mixture may be utilized directly for the formation of shaped articles of the copolymer. It will be recognized that an unneutralized acidic byproduct, e.g., hydrogen chloride, may cause significant corrosion problems in conventional processing equipment, such as in the spinnerets used for fiber preparation.

If the choice of comonomers employed does not lead to the production of hydrogen chloride during the polymerization reaction, the acidic byproduct of the polymerization may still be neutralized with the aforementioned bases, and the lithium chloride added to the polymerization mixture to assist in maintaining a fluid composition. Under the polymerization conditions useful in obtaining the copolymers described herein, the neutralization of the reaction mixture with the lithium base may produce an insoluble salt in the reaction mixture. Insoluble precipitates which may result by virtue of the choice of comonomers and neutralizing agent should be removed e.g. by filtration) before the polymerization mixture is extruded into fibers or cast into films.

Dope and Shaped Article Preparation

As previously noted, shaped articles such as fibers and films may be formed from dopes of the copolyamides of this invention.

The formula (I) copolyamides which are isolated in bulk form may be converted into shaped articles by first incorporating them into dopes which are then extruded into fibers, cast into films, etc. These dopes are essentially comprised of the copolyamide; a solvent or mixture of solvents selected from the group consisting of N,N-dimethylacetamide, N,N-dimethylpropionamide, N-methyl-pyrrolidone-2, hexamethylphosphoramide, N,N,N',N'-tetramethylurea admixed with lithium chloride; or strong acids such as concentrated sulfuric acid, $ClSO_3H$, and HF. In general, the maximum copolymer content possible in the dope decreases as the inherent viscosity of the copolyamide increases. Preferably, isolated bulk polymer is finely divided (e.g., comminuted by ball milling) prior to dope preparation. Dopes may contain from about 5 to about 12 weight percent of the copolyamide, from about 4 to about 6 weight percent of lithium chloride, and the balance is one or more of the appropriate solvents previously noted.

Dopes useful for extrusion into fibers may be prepared by stirring a suspension of copolyamide, solvent, and salt on a steam both until either a solution or a clear gel results. In the latter case, the gel may be cooled in ice water to obtain a free flowing solution. Addition of more copolymer or solvent to obtain a desirable dope may be necessary.

The dopes prepared as described above may be extruded into fibers by conventional wet- and dry-spinning techniques and equipment. In wet-spinning, an appropriately prepared dope, whose temperature may vary from 5° to about 50° C., is extruded into a suitable coagulating bath, e.g., a water bath maintained between about 10° to about 40° C. Other useful coagulants include ethylene glycol, mixtures of water and alcohol, and aqueous salt baths. Dry-spinning may be accomplished by extruding the warm dope into a heated current of gas whereby evaporation occurs and fibers are formed.

After being formed, the fibers may be passed over a finish application roll and wound up on bobbins. Development of maximum levels of filament and yarn properties is assisted by soaking the bobbins in water or mixtures of water and water miscible inert organic liquids (e.g., acetone, ethyl alcohol, N,N-dimethylacetamide) to remove residual solvent and salt, after which the fibers are dried. Removal of the salt and solvent may also be accomplished by running the fiber or yarn through aqueous baths on the run, by flushing the bobbins with water as the yarn is formed, and by soaking or washing skeins rather than bobbins, of yarn.

The dopes comprising the copolyamides of this invention may be formed into strong self-supporting films by conventional wet-extrusion methods. The dopes may also be used for fibrid preparation, useful for paper preparation, via the precipitation procedures described in Morgan U.S. Pat. No. 2,999,788.

It will be understood that the usual additives such as dyes, fillers, UV stabilizers, antioxidants, etc., can be incorporated in with the copolyamides for the purposes intended prior to shaped article preparation.

The properties of fibers prepared from the copolyamides of this invention are enhanced by a post-preparative heat treatment. For example, the tensile properties of as-extruding fibers can be increased by subjecting the fibers to a heat treatment wherein the fibers are kept under tension or are drawn slightly. Drawing may vary from essentially none to as much as 50 percent. Hot air ovens, hot pins, hot slots, hot plates, and liquid heating baths are useful for such treatments. The tensile properties of as-extruded fibers preferably are enhanced by applying heat in the temperature range of between about 300° to 600° C., preferably between about 400° to 550° C., to the fibers for between about 0.1 to 10 seconds in an inert atmosphere, preferably a nitrogen atmosphere while drawing the fibers from about 0 to 50 percent. The apparatus in which the copolyamide fibers exemplified herein are heated while under tension or being drawn is described hereinafter.

The high tenacity, high modulus copolyamide fibers of this invention, prepared by the means described above, exhibit tenacity values in excess of about 3 g.p.d., initial modulus values in excess of about 275 g.p.d., and orientation angles less than about 35°. Preferably, these fibers exhibit tenacity values in excess of about 4.5 g.p.d., initial modulus values in excess of about 400 g.p.d., and orientation angles less than about 25°.

The copolyamide fibers of this invention are useful for tire cords and in reinforced plastic laminates because of their high initial modulus, strength, and thermal stability. Specific end uses for laminates may include skis, bows, fishing rods, and golf club shafts.

MEASUREMENTS AND TESTS

Inherent Viscosity: Inherent viscosity ($\eta$inh) is defined by the following equation:

$$\eta \text{inh} = \frac{\ln (\eta \text{rel})}{C}$$

wherein ($\eta$rel) represents the relative viscosity and C represents a concentration of 0.5 gram of the polymer in 100 ml. of solvent, unless otherwise noted. The relative viscosity ($\eta$rel) is determined by dividing the flow time in a capillary viscometer of a dilute solution of the polymer by the flow time for the pure solvent. The dilute solutions used herein for determining ($\eta$rel) are of the concentration expressed by C, above; flow times are determined at 30° C., with concentrated (95–98percent) sulfuric acid as a solvent.

Tensile Properties: Fiber properties of tenacity, elongation, and initial modulus are coded as T/E/Mi and are reported in their conventional units. Denier is coded as Den. The boiling off treatment of fibers prior to physical testing consists of boiling the fibers 30 minutes in 0.1 percent aqueous sodium lauryl sulfate, rinsing, drying at 40° C. for 1 hours, and conditioning at 21° C. and 65 percent r.h. for 16 hours. Tensile properties are determined on filament samples measuring 1 inch (2.54 cm.) in length between the jaws of an Instron tester (product of the Instron Engineering Corp., Canton, Mass.), and which are subjected therein to a load sufficient to cause elongation to occur at the rate of 10 percent per minute measured at 21° C. and 65 percent r.h.

Heat Treatment:

Unless otherwise stated in the following examples, the post-extrusion heat treatment applied to the fibers and yarns of this invention comprises passing them through a heated, nitrogen-filled inner stainless steel tube 32 in. (81.3 cm.) × 0.3125 in. (7.94 mm.) (I.D.) mounted concentrically in a second tube [1.06 in. (2.69 cm.) O.D.], the whole assembly being centered in a 12 in. (30.48 cm.) electric furnace. Nitrogen gas enters through 2 nipples in the outer tube located 10 in. (25.4 cm.) out from either side of the center of the tube, such that the incoming nitrogen passes through the annular space between the two tubes. The nitrogen passes from the annular space into the inner tube through a small hole located in the wall of the inner tube to its center and thence out the ends of the inner tube at such a rate as to change the atmosphere in the 12 in. (30.48 cm.) heated zone of the inner tube at least once a minute. The outer ends of the device which protrude from the furnace are wrapped with asbestos fiber and glass tape to within about 2 in. (5.98 cm.) of each end. The temperature of the furnace is controlled by a thermocouple brazed to the center of the outside wall of the outer tube and connected to a Minneapolis-Honeywell "Pyrovane" controller. The heated tube has a temperature profile with the maximum temperature in the center region. The nominal heat-treating temperature is determined by a thermocouple brazed to the outer central surface of the inner tube. In passing fibers through the tube, guides are used to keep the fiber centered and out of contact with the tube walls.

Orientation Angle:

The orientation angle of the fiber (filament) is determined by the general method described in Krimm and Tobolsky, *Textile Research Journal*, Vol. 21, pp. 805–22 (1951). A wide angle X-ray diffraction pattern (transmission pattern) for the fiber is made using a Warhus pinhole camera. The camera consists of a collimator tube 3 in. (7.6 cm.) long with two lead (Pb) pinholes 25 mils (0.0635 cm.) in diameter at each end, with a sample-to-film distance of 5 cm.; a vacuum is created in the camera during the exposure. The radiation is generated by Philips X-ray unit (Catalog No. 12045) with a copper fine-focus diffraction tube (Catalog No. 32172) and a nickel beta-filter; the unit is operated at 40 kv. and 16 ma. A fiber-sample holder 20 mils (0.051 cm.) thick is filled with the sample; all the filaments that are in the X-ray beam are kept parallel. The diffraction pattern is recorded on Kodak No-Screen medical X-ray film (NS–54T) or equivalent. The film is exposed for a sufficient time to obtain a pattern which is considered acceptable by conventional standards (e.g., a pattern in which the diffraction spot to be measured has a sufficient photographic density, e.g., between 0.2 and 1.0, to be accurately readable). Generally, an exposure time of about 45 minutes is suitable; however, a lesser exposure time may be suitable, and even desirable, for highly crystalline and oriented samples to obtain a more accurately readable pattern. The exposed film is processed at a temperature of 68±2° F. in Du Pont Cronex X-ray developer for 3 min., in a stop bath (30 ml. of glacial acetic acid in 1 gal. [3,785 l.]of distilled water) for 15 sec., and in General Electric Supermix X-ray fixer and hardener solution for 10 min. The film is washed in running water for 0.5 hr. and is dried.

The arc length in degrees at the half-minimum intensity (angle subtending points of 50 percent of maximum intensity) of the principal equatorial spot is measured and taken as the orientation angle of the sample.

The method used to determine orientation angles in the filaments of the instant invention employs an improved version of the "flying-spot" densitometer described by Owens and Statton in "Acta Cryst." (1957), 10, 560–562. The equipment used is similar to that described by Owens and Statton in their FIG. 1, with the following differences:

1. The Sola Constant Voltage Transformer No. 80808 is replaced by catalog No. 23-22-112, and this unit is connected only in series between the master switch of the 500 Volt Regulated Supply.

2. The Dumont No. 304 A Display Oscilloscope and the adjacent Calibrating Signal Generator are replaced by a Tektronix 532 Display Oscilloscope combined with a Tektronix Type 53/54 K Preamplifier. The combined units are connected in series only between the Main Switch and the Photomultiplier.
3. The Flying Spot Oscilloscope (Dumont No. 304 A) and its Cathode-Ray Tube are replaced by a Tektronix 536 Oscilloscope having a 536 P 5 Cathode-Ray Tube.
4. The 500 Volt Regulated Supply is connected to the Photomultiplier and also to the Circle Generator (a type of device designated by Owens and Statton as a Scanning Frequency Generator).
5. The Circle Generator is connected at one point through a Tektronix Type 53/54 K Horizontal Preamplifier and at a second point through a line-circle switch and a Tektronix Type 53/54 K Vertical Preamplifier to the Tektronix 536 Oscilloscope.

Operation of this device follows the instructions given by Owens and Statton, except that the calibration with a square wave from a signal generator is not necessary. As described in the article, a metal block conveniently establishes the infinite density level of the display diagram. A clear portion of the film provides a reference for zero density.

As noted by the authors, the "flying-spot" densitometer provides a rapid measure of the orientation angle and the photographic density (optical density).

EXAMPLES

The following nonlimiting examples are illustrative of the practice of this invention. Parts and percentages are by weight unless otherwise indicated.

EXAMPLE 1

This example illustrates the preparation of (1) a formula (I) polyamide wherein $X+Y=4$ and $Z=2$, and (2) fibers thereof.

p-Aminobenzoyl chloride hydrochloride (15.36 g., 0.08 mole) and 10 ml. of tetrahydrofuran (THF) are placed in a resin kettle fitted with an "eggbeater" type stirrer. To this is added p-phenylenediamine (2.16 g., 0.02 mole) in 100 ml. of hexamethylphosphoramide (HMPA); a 10 ml. rinse of HMPA is added to the kettle, also. After the combined ingredients are stirred for 0.5 hr., the solution is cooled in an icebath and succinyl chloride (3.18 g., 0.02 mole) in 20 ml. of THF is added to the kettle, followed by two 5 ml. rinses of THF. The reaction mixture is stirred in the cold for 1 hr., then stirred overnight at room temperature. The resulting thick white paste is combined with water. The precipitated polymer is then collected, washed (blender) five times with water and once with 2B alcohol, and dried at 80° C. in a vacuum oven; $\eta$inh=1.29.

A spinning dope is prepared by combining 9 g. of the above-prepared polyamide with 70 g. of a mixture of N,N-dimethylacetamide/LiCl (95/5, wt./wt.; this mixture is hereinafter identified as the "solvent mixture."). The dope (containing 11.4 percent by weight polymer) is extruded through a 20-hole spinneret (each hole of 0.003 inch diameter) into a water bath (maintained at 28° C.) and coagulated into filaments which are wound up at 16 ft./min. After the resultant yarn is extracted with water and dried, the filaments thereof exhibit the following tensile properties: T/E/Mi: 1.46/33/71. After the yarn has been drawn 1.3X at 400° C., the filaments thereof exhibit the following tensile properties: 1/E/M: 5.6/1.5/476; the filaments are highly crystalline; O.A.=15°.

EXAMPLE 2

This example illustrates preparation of (1) a formula (I) polyamide wherein $X+Y=4$ and $Z=4$, and (2) fibers thereof.

The procedure of example 1, above, is repeated with the exception that adipyl chloride (3.66 g., 0.02 mole) is used instead of succinyl chloride. Also, only a single 5 ml. THF rinse is employed. For the ovendried product, $\eta$inh =1.59.

A spinning dope is prepared by combining 11 g. of the above-prepared polyamide with 105 g. of solvent mixture on a steam bath, with stirring. The dope (containing 9.5 percent solids) is extruded as in example 1 into a water bath maintained at 22° C. and coagulated into filaments which are wound up at 23 ft./min. After the resultant yarn is washed and dried as in example 1, the filaments thereof exhibit the following tensile properties: T/E/Mi: 1.5/23/76. After the as-extruded yarn has been drawn 1.05X at 500° C., the filaments thereof exhibit the following tensile properties: T/E/Mi: 8.1/1.6/571; O.A.=13°.

EXAMPLE 3

This example illustrates preparation of (1) a formula (I) polyamide wherein $X+Y=8$ and $Z=2$, and (2) fibers thereof.

p-Aminobenzoyl chloride hydrochloride (30.72 g., 0.16 mole) and 20 ml. of THF are placed in a resin kettle as in example 1. The procedure of example 1, above is then followed with the exception that the p-phenylenediamine is dissolved in 200 ml. of HMPA. For the oven dried product, $\eta$inh =1.28.

A spinning dope is prepared by combining 7.5 g. of the above-prepared polyamide with 105 g. of the solvent mixture on a steam bath, with stirring. The dope (containing 6.6 percent solids) is extruded as in example 1 into a water bath (maintained at ambient temperature) and coagulated into filaments which are wound up at 62 ft./min. After the resultant yarn is extracted with water and dried, the filaments thereof exhibit the following tensile properties: T/E/Mi: 2.1/40/86. After the yarn has been drawn 1.4X at 300° C., the filaments thereof exhibit the following tensile properties: T/E/Mi: ; O.A.=23°. After the as-extruded yarn has been drawn 1.4X at 400° C., the filaments thereof exhibit the following tensile properties: T/E/Mi: 4.8/1.3/433; O.A.=13°

EXAMPLE 4

This example illustrates preparation of (1) a formula (I) polyamide wherein $X+Y=8$ and $Z=4$, and (2) fibers thereof.

The procedure of example 3, above, is repeated with the exceptions that the diacid chloride employed is adipyl chloride (3.66 g., 0.02 mole) and that stirring with cooling is performed for 0.5 hr. just prior to permitting the reaction mixture to stand overnight. For the ovendried product, $\eta$inh =1.69.

A free-flowing spinning dope is prepared by first combining 10 g. of the above-prepared polyamide with 90 g. of solvent mixture; the combined ingredients are then maintained on a steam bath for 2 hrs. The dope (containing 10 percent by weight polymer) is extruded through a spinneret (similar to that in example 1) into a water bath maintained at 21° and coagulated into filaments which are wound up at 13.5 ft./min. After the resultant yarn is extracted with water and dried, the filaments thereof exhibit the following tensile properties: T/E/Mi: 1.7/40/73. After the yarn has been drawn 1.2X at 536° C., the filaments thereof exhibit the following tensile properties: T/E/Mi: 9.1/1.3/737; O.A.=9°.

EXAMPLE 5

This example illustrates preparation of a formula (I) polyamide wherein $X+Y=8$ and $Z=10$.

The procedure of example 1, above, is repeated with the exceptions that only half the previous amount of p-phenylenediamine is employed and that dodecanedioyl chloride (2.67 g., 0.01 mole) is employed as the diacid chloride. For the ovendried product, $\eta$inh =1.39.

EXAMPLE 6

This example illustrates the preparation of (1) a formula (I) polyamide wherein $X+Y=12$ and $Z=2$, and (2) fibers thereof.

p-Aminobenzoyl chloride hydrochloride (23.04 g., 0.12 mole) and 20 ml. of THF are placed in a resin kettle. To this is added p-phenylenediamine (1.08 g., 0.01 mole) in 130 ml. of HMPA; a 20 ml. rinse of HMPA is employed also. The combined ingredients are stirred for 0.5 hr. The solution is cooled in an icebath and succinyl chloride (1.59 g., 0.01 mole) in 10 ml. of THF is then added to the kettle, followed by two 5 ml. rinses of THF. The reaction mixture is stirred in the cold for about 0.5 hr., after which it is permitted to stand at room temperature overnight. The reaction mixture is then combined with water to precipitate the polymer which is collected, washed (blender) 4 times with water and once with 2B alalcohol and dried at 100° C. in a vecuum oven; $\eta$inh=1.11.

A spinning dope is prepared by combining 10 g. of the above-prepared polyamide with 90 g. of solvent mixture to form a very viscous clear solution. An additional 25 g. of solvent mixture are added. The dope (containing 8 percent by weight polymer) is extruded through a spinneret similar to that in example 1 into a water bath maintained at 28° C. and coagulated into filaments which are wound up at 52 ft./min. After the resultant yarn is extracted with water and dried, the filaments thereof exhibit the following tensile properties: T/E/Mi: 1.6/17/82. After the yarn has been drawn 1.3X at 450° C., the filaments thereof exhibit the following tensile properties: T/E/Mi: 4.6/1.0/494; O.A.=13°.

EXAMPLE 7

This example illustrates the preparation of (1) a formula (I) polyamide wherein $X+Y=12$ and $Z=4$, and (2) fibers thereof.

p-Aminobenzoyl chloride hydrochloride (23.04 g., 0.12 mole) and 20 ml. of THF are placed in a resin kettle, with stirring. To this is added p-phenylenediamine (1.08 g., 0.01 mole) in 130 ml. dry HMPA, with rapid stirring. A 20 ml. rinse of HMPA is added to the kettle, also. After 0.5 hr., a viscous, clear solution results; this is then cooled in ice for an additional 0.5 hr. Adipyl chloride (1.83 g., 0.01 mole) is added to the kettle, followed by two 5 ml. rinses of THF. The resulting solution is stirred, with ice bath cooling for 0.5 hr., after which the ice bath is removed. In 20 minutes, the reaction mixture forms an unstirrable, clear mass which is permitted to stand overnight at room temperature. The reaction mixture is then combined with water to precipitate the polymer which is collected, washed (blender) 5 times with water and once with 2B alcohol, and dried at 80° C. overnight in a vacuum oven; $\eta$inh=1.6.

A spinning dope is prepared by combining 12 g. of the above-prepared polyamide with 108 g. of the solvent mixture. The dope ingredients are stirred on a steam bath for 0.5 hr. to form a clear, viscous dope which is maintained overnight at room temperature. The dope (containing 10 percent by weight polymer) is centrifuged. It is then extruded through a spinneret similar to that described in example 1 into a water bath maintained at 11° C. and coagulated into filaments which are wound up at 25 ft./min. After the resultant yarn is extracted for 16 hours in distilled water and dried, the filaments thereof exhibit the following tensile properties: T/E/Mi: 1.8/29/83. After the yarn has been drawn 1.2X at 480° C., the filaments thereof exhibit the following tensile properties: T/E/Mi: 10/1.6/705; O.A.=11°. filaments from yarn which was drawn 1.2X at 538° C. exhibit the following tensile properties: T/E/Mi: 13/1.7/870; O.A.= 11°.

EXAMPLE 8

This example illustrates the preparation of (1) a formula (I) polyamide wherein $X+Y=12$ and $Z=10$, and (2) fibers thereof.

The procedure of example 7 above, is repeated with the exception that dodecanedioyl chloride (2.67 g. 0.01 mole) is the diacid chloride employed; this is added in 10 ml. of THF and two 5 ml. THF rinses are also added. After the addition of diacid chloride, the reaction mixture is permitted to stand overnight at room temperature. The reaction mixture is then combined with water to precipitate the polymer which is collected, washed (blender) 5 times with water, and dried at 100° C. in a vacuum oven; $\eta$inh=1.36.

A spinning dope is prepared by combining 10 g. of the above-prepared polyamide with 90 g. of the solvent mixture. This combination (containing 10 percent by weight polymer) is heated on a steam bath for 20 minutes, then is cooled in ice, after which an additional 20 g. of solvent mixture are added, with stirring and cooling. The viscous dope is centrifuged before being extruded through a spinneret (similar to that in example 1) into a water bath maintained at 25° C. and coagulated into filaments which are wound up at 39 ft./min. After the resultant yarn is extracted in water and dried, the filaments thereof exhibit the following tensile properties: T/E/Mi: 1.7/9.2/104. After the yarn has been drawn 1.1X at 536° C., the filaments thereof exhibit the following tensile properties: T/E/Mi: 6.8/1.8/449; O.A.=11°.

EXAMPLE 9

This example illustrates the preparation of (1) a formula (I) polyamide wherein $X+Y=18$ and $Z=10$, and (2) fibers thereof.

p-Aminobenzoyl chloride hydrochloride (34.56 g., 0.18 mole) and 40 ml. of THF are combined. To this is added p-phenylenediamine (1.08 g., 0.01 mole) in 150 ml. HMPA; a 50 ml. rinse of HMPA is added, also. After the combined ingredients are stirred for 0.5 hr., they are cooled in an ice bath (with stirring) and dodecanedioyl chloride (2.67 g., 0.01 mole) in 10 ml. of THF is added, followed by 5 ml. rinses of THF. The reaction mixture is stirred in the cold for 5 min., after which it becomes unstirrable. The reaction mixture is then left overnight at room temperature. It is then combined with water to precipitate the polymer which is collected, washed (blender) 5 times with water and once with 2B alcohol, and dried at 110° C. in a vacuum oven under nitrogen; $\eta$inh=1.86.

A spinning dope is prepared by combining 8 g. of the above-prepared polyamide with 92 g. of solvent mixture. The combined ingredients are first stirred on the steam bath for 0.5 hr., after which they are cooled in ice for 1.5 hrs. An additional 14 g. of solvent mixture are then added, with stirring and cooling being continued. There is obtained a free-flowing, viscous dope containing 7 percent by weight polymer. The dope is extruded through a spinneret (similar to that in example 1) into a water bath maintained at 11° C. and coagulated into filaments which are wound up at 22 ft./min. After the resultant yarn is extracted with water overnight and dried in air, the filaments thereof exhibit the following tensile properties: T/E/Mi: 2.4/30/87. Filament tensile properties observed after the yarn has been drawn under various conditions are recorded in table I, below.

TABLE I

| Yarn drawing conditions | Filament properties | | | Orientation angle (deg.) |
|---|---|---|---|---|
| | T | E | Mi | |
| 1.2X at 450° C | 8.1 | 2.1 | 438 | 11 |
| 1.2X at 480° C | 8.5 | 2.1 | 484 | 11 |
| 1.1X at 536° C | 9.3 | 2.2 | 474 | 13 |
| 1.3X at 536° C | 9.5 | 1.8 | 571 | 10 |

EXAMPLE 10

This example illustrates the preparation of (1) a formula (I) polyamide wherein $X+Y=23$ and $Z=4$, and (2) fibers thereof.

p-Aminobenzoyl chloride hydrochloride (44.56 g., 0.23 mole) and 40 ml. of THF are combined in a resin kettle. To this is added p-phenylenediamine (1.08 g., 0.01 mole) in 150 ml. of HMPA; a 50 ml. rinse of HMPA is added to the kettle, also. The resulting clear, viscous solution is stirred at room temperature for 0.5 hr. The solution is then cooled in ice and adipyl chloride (1.83 g., 0.01 mole) in 10 ml. of THF is added, followed by two 5 ml. rinses of THF. The ice bath is removed and stirring continued for 10 minutes, after which time the reaction mixture becomes unstirrable. After the reaction mixture is permitted to stand overnight at room temperature, it is combined with water to precipitate the polymer which is collected, washed (blender) with water and 2B alcohol, and dried at 80° C. in a vacuum oven; $\eta inh$=1.72.

A spinning dope is prepared by combining 15 g. of the above-prepared polyamide with 155 g. of solvent mixture. After the combined ingredients are warmed on a steam bath for 20 min. and permitted to stand at room temperature 2 hr., a clear, viscous dope containing 8.8 percent by weight polymer is obtained. The dope is permitted to stand overnight at room temperature, after which it is centrifuged. The dope is extruded through a spinneret (similar to that in example 1 ) into a water bath maintained at 11° C. and coagulated into filaments which are wound up at 32 ft./min. After the resultant yarn is extracted with water and dried in air, the filaments thereof exhibit the following tensile properties: T/E/Mi: 2.2/25/74. Filament tensile properties observed after the yarn has been drawn under various conditions are recorded in Table II, below.

TABLE II

| Yarn drawing conditions | Filament properties | | | Orientation angle (deg.) |
|---|---|---|---|---|
| | T | E | Mi | |
| 1.05X at 450° C | 8.9 | 2.4 | 458 | 26 |
| 1.05X at 480° C | 11.2 | 2.1 | 604 | 15 |
| 1.1X at 536° C | 11.8 | 1.9 | 674 | 11 |
| 1.2X at 536° C | 12.4 | 2.3 | 607 | 13 |

EXAMPLE 11

This example illustrates the preparation of (1) a formula (I) polyamide wherein X+Y =12 and Z =5, and (2) fibers thereof.

The procedure of example 7, above, is repeated with the exception that the first-combined ingredients are stirred for 1 hr. before being cooled in ice. Then, in place of the adipyl chloride, there is added pimeloyl chloride (1.97 g., 0.01 mole) in 10 ml. of THF, followed by a 5 ml. rinse of THF. The stirred reaction mixture becomes a crumbling gel in about 10 min. and is permitted to stand overnight at room temperature. The reaction mixture is then combined with water to precipitate the polymer which is collected, washed (blender) 4 times with water, once with 2B alcohol and once with acetone, and dried overnight in a vacuum oven; $\eta inh$=1.75.

A spinning dope is prepared by combining 10 g. of the above-prepared polyamide with 90 g. of solvent mixture. These ingredients are heated on a steam bath for 15 min., after which they are permitted to cool. An additional 10 g. of solvent mixture is added to form at room temperature, a fluid spinning dope containing 9.1 percent by weight polymer. The dope is extruded through a spinneret (similar to that shown in example 1) into a water bath maintained at 28° C. and coagulated into filaments which are wound up at 40 ft./min. After the resultant yarn is extracted with water and dried, the filaments thereof exhibit the following tensile properties: T/E/Mi: 1.8/28/74. After the yarn has been drawn 1.25X at 538° C., the filaments thereof exhibit the following tensile properties: T/E/Mi: 10/1.8/612; O.A.=12°What is claimed is:

1. An aromatic-aliphatic ordered copolyamide consisting essentially of repeating structural units corresponding to the formula

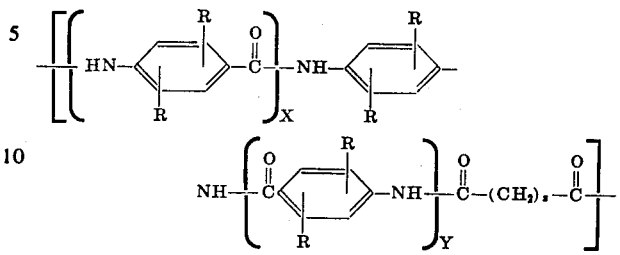

wherein X and Y are individually selected positive integers and the sum of X+Y is an integer within the range of 4 to 24, inclusive, Z is an integer from 2 to 12, inclusive, and each R is individually selected from the group consisting of hydrogen and a monovalent radical replacement for hydrogen on nuclear carbon which is nonreactive in polyamidation reactions; and having an inherent viscosity of at least 0.8, measured at 30° C. using a solution containing 0.5 g. of the polymer in 100 ml. of concentrated (95-98 percent) sulfuric acid.

2. An aromatic-aliphatic ordered copolyamide as recited in claim 1, wherein R is selected from the group consisting of hydrogen, halogen, lower alkyl, lower alkoxy, cyano, nitro, alkylthio, alkysulfonyl, alkylsulfamoyl, and carboalkoxy.

3. An aromatic-aliphatic ordered copolyamide as recited in claim 1, wherein the sum of X+Y is 8 and Z is 4.

4. An aromatic-aliphatic ordered copolyamide as recited in claim 1, wherein the sum of X+Y is 12 and Z is 4.

5. An aromatic-aliphatic ordered copolyamide as recited in claim 1, wherein the sum of X+Y is 23 and Z is 4.

6. An aromatic-aliphatic ordered copolyamide as recited in claim 1, wherein the sum of X+Y is 12 and Z is 5.

7. A shaped article of the aromatic-aliphatic copolyamide recited in claim 1.

8. A shaped article of claim 7 in film form.

9. A shaped article of claim 7 in fiber form.

10. A fiber of the aromatic-aliphatic copolyamide recited in claim 1, having a tenacity value in excess of about 3 g.p.d., initial modulus value in excess of about 275 g.p.d., and an orientation angle less than about 35°.

11. A fiber of the aromatic-aliphatic copolyamide recited in claim 1, having a tenacity value in excess of about 4.5 g.p.d., initial modulus value in excess of about 400 g.p.d., and an orientation angle less than about 25°.

12. A process for improving tensile properties of a fiber of the aromatic-aliphatic copolyamide of claim 1, comprising applying heat in the temperature range of between about 300° to 600° C. to said fiber for between about 0.1 to 10 seconds in an inert atmosphere, while drawing said fiber from about 0 to 50 percent.

13. A process as recited in claim 12, wherein said temperature range is between about 400° to 550°C.

* * * * *